US 8,582,649 B2

(12) United States Patent
Nakaishi et al.

(10) Patent No.: US 8,582,649 B2
(45) Date of Patent: Nov. 12, 2013

(54) ENCODING DEVICE AND ENCODING METHOD AND DECODING DEVICE AND DECODING METHOD

(75) Inventors: Hidenori Nakaishi, Yokohama (JP); Yoshimasa Itsuki, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1272 days.

(21) Appl. No.: 12/230,534

(22) Filed: Aug. 29, 2008

(65) Prior Publication Data

US 2009/0060038 A1   Mar. 5, 2009

(30) Foreign Application Priority Data

Aug. 31, 2007  (JP) ................................ 2007-226326

(51) Int. Cl.
*H04N 7/12* (2006.01)
(52) U.S. Cl.
USPC ................................................... 375/240.12
(58) Field of Classification Search
USPC ............................................. 375/240–240.2
See application file for complete search history.

(56) References Cited

U.S. PATENT DOCUMENTS

| 5,796,434 | A | 8/1998 | Lempel |
| 6,553,068 | B1 * | 4/2003 | Wake et al. ............... 375/240.14 |
| 2004/0017851 | A1 | 1/2004 | Haskell et al. |
| 2006/0088097 | A1 | 4/2006 | Park |
| 2008/0165860 | A1 * | 7/2008 | Sahraoui et al. ......... 375/240.25 |

FOREIGN PATENT DOCUMENTS

| JP | 10-136382 | 5/1998 |
| JP | 2002-199405 | 7/2002 |
| JP | 2006-509463 | 3/2006 |
| JP | 2006-121702 | 5/2006 |

OTHER PUBLICATIONS

Boyce, J., "Weighted Prediction in the H.264/MPEG4 AVC Video Coding Standard", ISCAS, pp. 789-792 (May 2004).*
Japanese Patent Office Notice of Reasons for Rejection mailed May 17, 2011, for corresponding Japanese Patent Application No. 2007-226326.
Japanese Patent Office Action mailed May 8, 2012 in corresponding Japanese Patent Application No. 2007-226326.
Xiangyang Ji et al., New Scaling Technique for Direct Mode Coding in B Pictures, 2004 International Conference on Image Processing, IEEE, Oct. 24, 2004, vol. 1, pp. 469-472.

* cited by examiner

*Primary Examiner* — Kibrom T Hailu
*Assistant Examiner* — Benjamin Lamont
(74) *Attorney, Agent, or Firm* — Staas & Halsey LLP

(57) ABSTRACT

An encoding device including a calculation result storage unit adapted to store information based on a result of a difference calculation of the differential encoding along with information on a referenced picture used for the differential calculation a determination unit determining from the information on the referenced picture stored in the calculation result storage unit whether the difference calculation has been performed on the picture to be referred used for the difference calculation of a picture which undergoes the image compression, as a reference target of the difference calculation and a differential encoding unit reading from the calculation result storage unit the information on the result of the difference calculation corresponding to the picture to be referred and performs the differential encoding based on a determination by the determination unit that the difference calculation has been performed, as the reference target, on the picture to be referred.

13 Claims, 15 Drawing Sheets

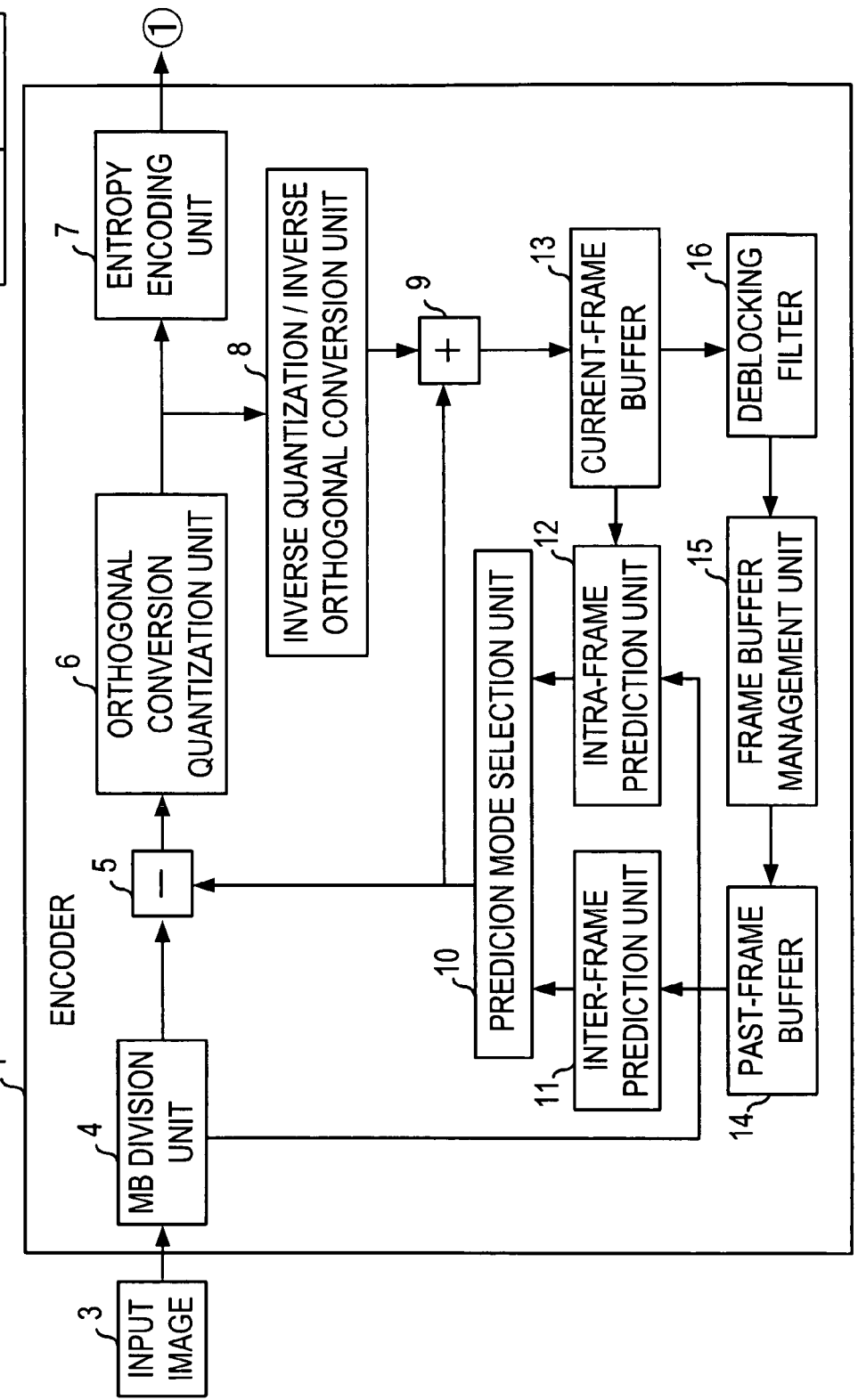

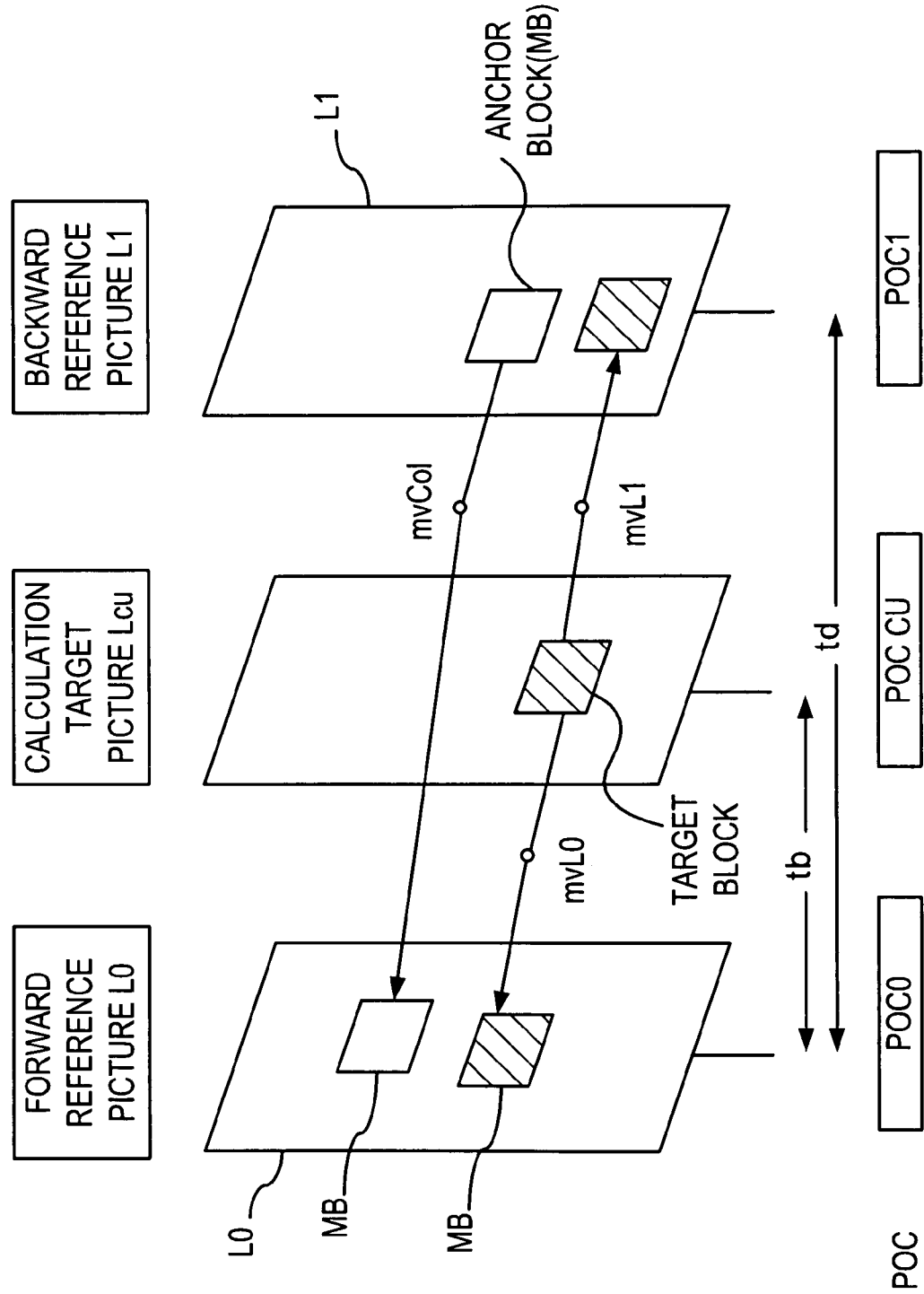

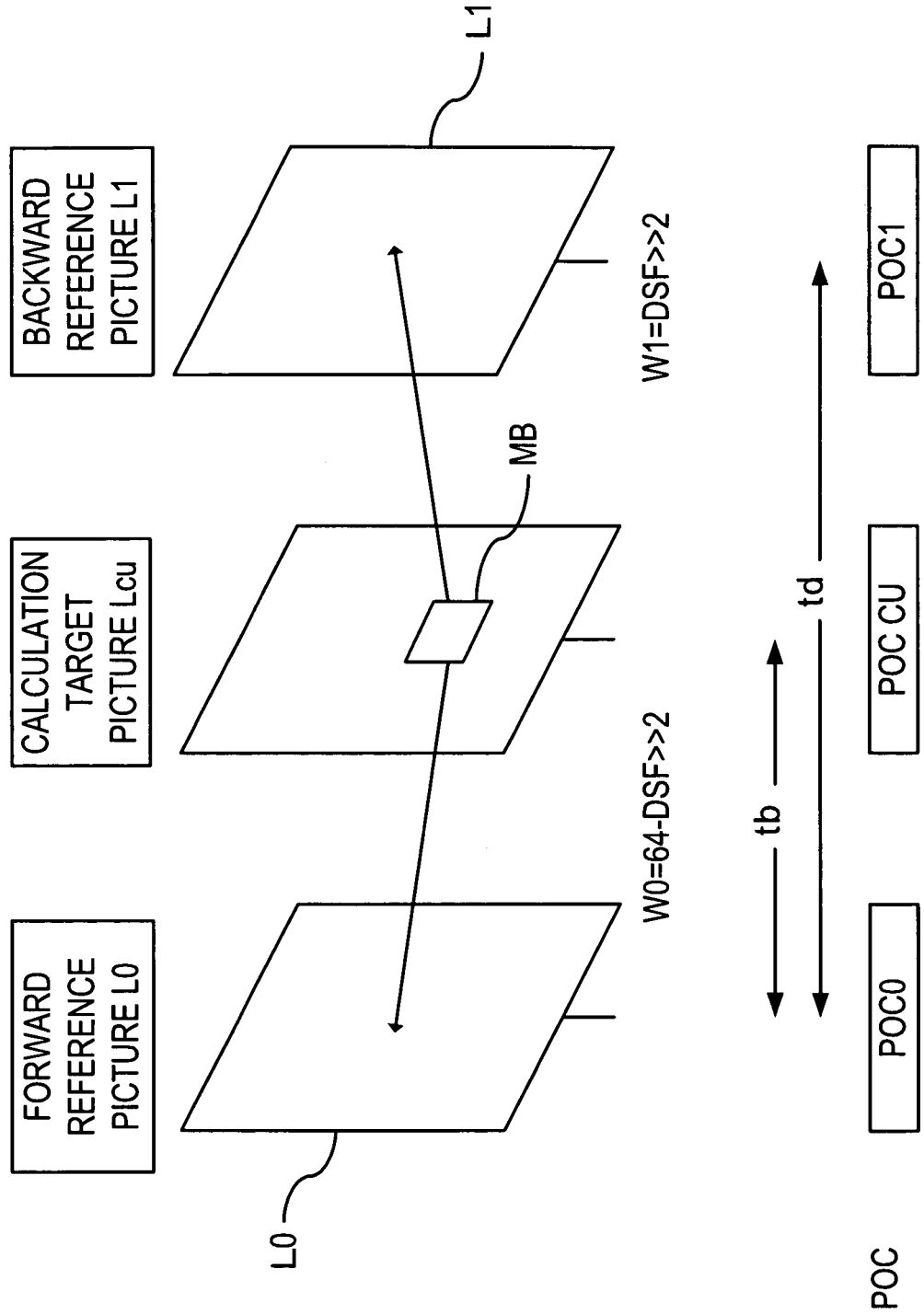

FIG. 7

| ADDRESS | DATA | |
|---|---|---|
| 0 | DISTSCALEFACTOR CALCULATION RESULT | HitFlag |
| 1 | DISTSCALEFACTOR CALCULATION RESULT | HitFlag |
| 2 | DISTSCALEFACTOR CALCULATION RESULT | HitFlag |
| 3 | DISTSCALEFACTOR CALCULATION RESULT | HitFlag |
| 4 | DISTSCALEFACTOR CALCULATION RESULT | HitFlag |
| 5 | DISTSCALEFACTOR CALCULATION RESULT | HitFlag |
| 6 | DISTSCALEFACTOR CALCULATION RESULT | HitFlag |
| 7 | DISTSCALEFACTOR CALCULATION RESULT | HitFlag |
| ... | ... | ... |
| 34 | DISTSCALEFACTOR CALCULATION RESULT | HitFlag |
| 35 | DISTSCALEFACTOR CALCULATION RESULT | HitFlag |

Address structure: PICTURE INDEX (0, 1, 2, 3, ..., 17) / PARITY (0, 1)

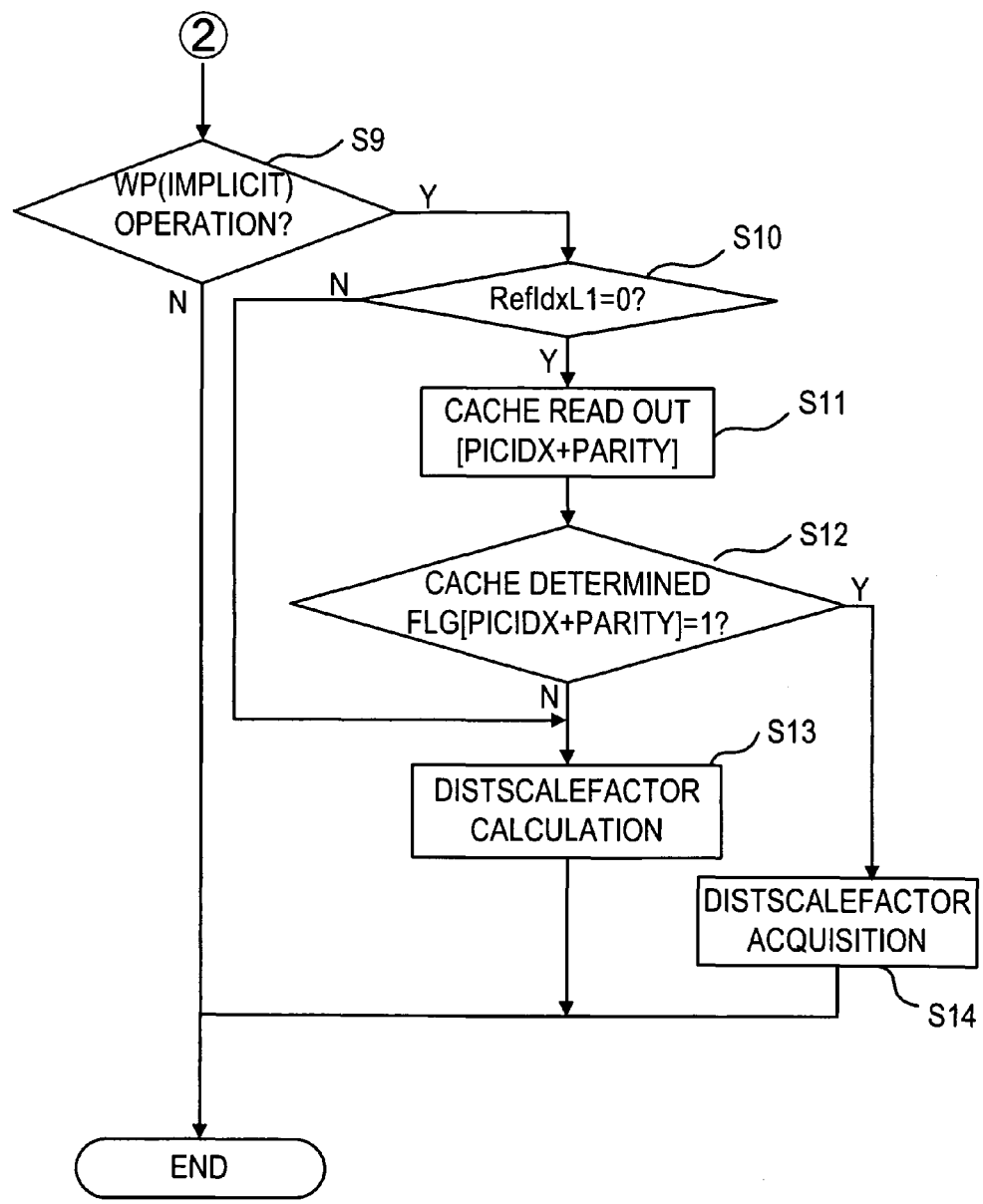

ENCODING DEVICE AND ENCODING METHOD AND DECODING DEVICE AND DECODING METHOD

CROSS-REFERENCE TO RELATED APPLICATION

This application is based upon and claims the benefit of priority of the prior Japanese Patent Application No. 2007-226326, filed on Aug. 31, 2007, the entire contents of which are incorporated herein by reference.

BACKGROUND

1. Field

The embodiments discussed herein are directed to image data encoding/decoding with use of differential encoding and may include a "speed-up" technique for an inter-frame prediction process.

2. Description of the Related Art

In recent years, standards such as H.264, MPEG-4, VC-1, AVS, and so on are well known as image compression techniques making use of differential encoding.

Methods of performing an inter-frame prediction used for the above-discussed standards include a "Temporal Direct" mode operation or a "Weighted Prediction" operation. For the above operations, a calculation using a Distance Scale Factor (DSF) is used.

However, because the calculation using the DSF takes quite a lot of time in executing a calculation process, reduction in calculation time is desired.

FIG. 12 illustrates a schematic diagram of an inter-frame prediction unit including a Temporal Direct mode process unit and a Weighted Prediction process unit.

The Temporal Direct mode process unit and the Weighted Prediction process unit include a Macro Block (MB) analysis unit 121, a TD/WP coefficient activation selection unit 122, a TD operation unit 123, a WP coefficient operation unit 124, a RefIdx-PicIdx conversion table 125, a PicIdx-Poc conversion table 126, a DSF calculator 127, a motion vector (MV) generation unit 128, a WP coefficient generation unit 129, an image generation unit 1210, and a past-frame buffer 1211.

The MB analysis unit 121 analyzes a Macro Block type (MB_type) and analyzes whether to perform a Temporal Direct mode process or a Weighted Prediction process. Hereinafter, the Temporal Direct mode is referred to as a "TD process" and the Weighted Prediction is referred to as a "WP process."

The TD/WP coefficient activation selection unit 122 chooses the TD operation unit 123 in performing the TD process based on a result of a determination made by the MB analysis unit 121 and chooses the WP coefficient operation unit 124 in performing the WP process.

The TD operation unit 123 executes the Temporal Direct mode operation and outputs a START signal activating the DSF calculator 127.

Next, the TD operation unit 123 acquires an operation result by the DSF calculator 127 and outputs a TD operation result to the MV generation unit 128.

The WP coefficient operation unit 124 performs a weighted prediction and outputs the START signal activating the DSF calculator 127.

Then, the WP coefficient operation unit 124 acquires a calculation result of the DSF calculator 127 and outputs a WP operation result to the WP coefficient generation unit 129.

The RefIdx-PicIdx conversion table 125 generates a picture index (PicIdx) corresponding to a reference picture index (RefIdx) used by the TD operation unit 123 or by the WP coefficient operation unit 124.

The PicIdx-Poc conversion table 126 generates a forward reference Picture Order Count (POC0) and a backward reference Picture Order Count (POC1) based on the reference picture index and parity (Parity).

The DSF calculator 127 performs a Clip3 process with use of a POCCU and outputs (a POC0 and a POC1) from the PicIdx-Poc conversion table 126 and outputs the DSF calculation result to the TD operation unit 123 or the WP coefficient operation unit 124, one of which has already been chosen.

The MV generation unit 128 performs a switching operation between a motion vector output that is output from the TD operation unit 123, and peripheral prediction vectors other than the TD operations, and transfers a motion vector to the image generation unit 1210.

The WP coefficient generation unit 129 performs a switching operation between a WP coefficient operation output that is output from the WP coefficient operation unit 124 (Implicit) and outputs of the WP coefficient operations of the other WP operations, and transfers a motion vector to the image generation unit 1210.

The image generation unit 1210 generates an inter-frame prediction image with use of the output from the MV generation unit 128 or the output from the WP coefficient generation unit 129 relative to an image of the past-frame buffer 1211.

The past-frame buffer 1211 is a memory that stores previously accumulated frames.

However, it should be noted that, in the operations performed by the Temporal Direct mode operation unit and the Weighted Prediction operation unit discussed above, the DSF calculation is performed in each operation by using a picture that is an object of decoding, a forward reference picture, and a backward reference picture with respect to each Macro Block (MB). Consequently, the efficiency of calculations is low relative to the length of process time.

Moreover, if a cache (memory) is provided on a chip to cause the cache (memory) to perform the DSF calculation, the pictures are separately managed with respect to each picture, such as, the picture that is the object of decoding, the forward reference picture, and the backward reference picture. For example, in a case of a reference frame with 32 Bits, if the number of pictures (L0) referred to by the forward reference picture is 32, and the number of pictures (L1) referred to by the backward reference pictures is also 32, a memory equal to 32×32×32 words (Word) is required, which is not practical.

Furthermore, Japanese Laid-open Patent Publication No. 1998-136382, Japanese Laid-open Patent Publication No. 2002-199405, and Japanese Laid-open Patent Publication No. 2006-121702 disclose methods of reducing calculation process times necessary for the inter-frame prediction, respectively.

SUMMARY

According to one aspect of an embodiment, an encoding device which performs image compression with differential encoding, the encoding device including: a calculation result storage unit being adapted to store information based on a result of a difference calculation of the differential encoding along with information on a picture to be referred which is used for the differential calculation; a determination unit which determines from the information on the picture to be referred which is stored in the calculation result storage unit whether the difference calculation has been performed on the picture to be referred which is used for the difference calculation of a picture which undergoes the image compression, as a reference target of the difference calculation; and a differential encoding unit which reads from the calculation result storage unit the information on the result of the difference calculation corresponding to the picture to be referred and performs the differential encoding based on a determination by the determination unit that the difference calculation has been performed, as the reference target, on the picture to be referred.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 illustrates a principle of a Temporal Direct mode operation;

FIG. 3 illustrates a principle of a Weighted Prediction operation;

FIG. 7 is a schematic diagram illustrating a structure of a memory;

DETAILED DESCRIPTION OF THE EMBODIMENTS

Figure 1B:
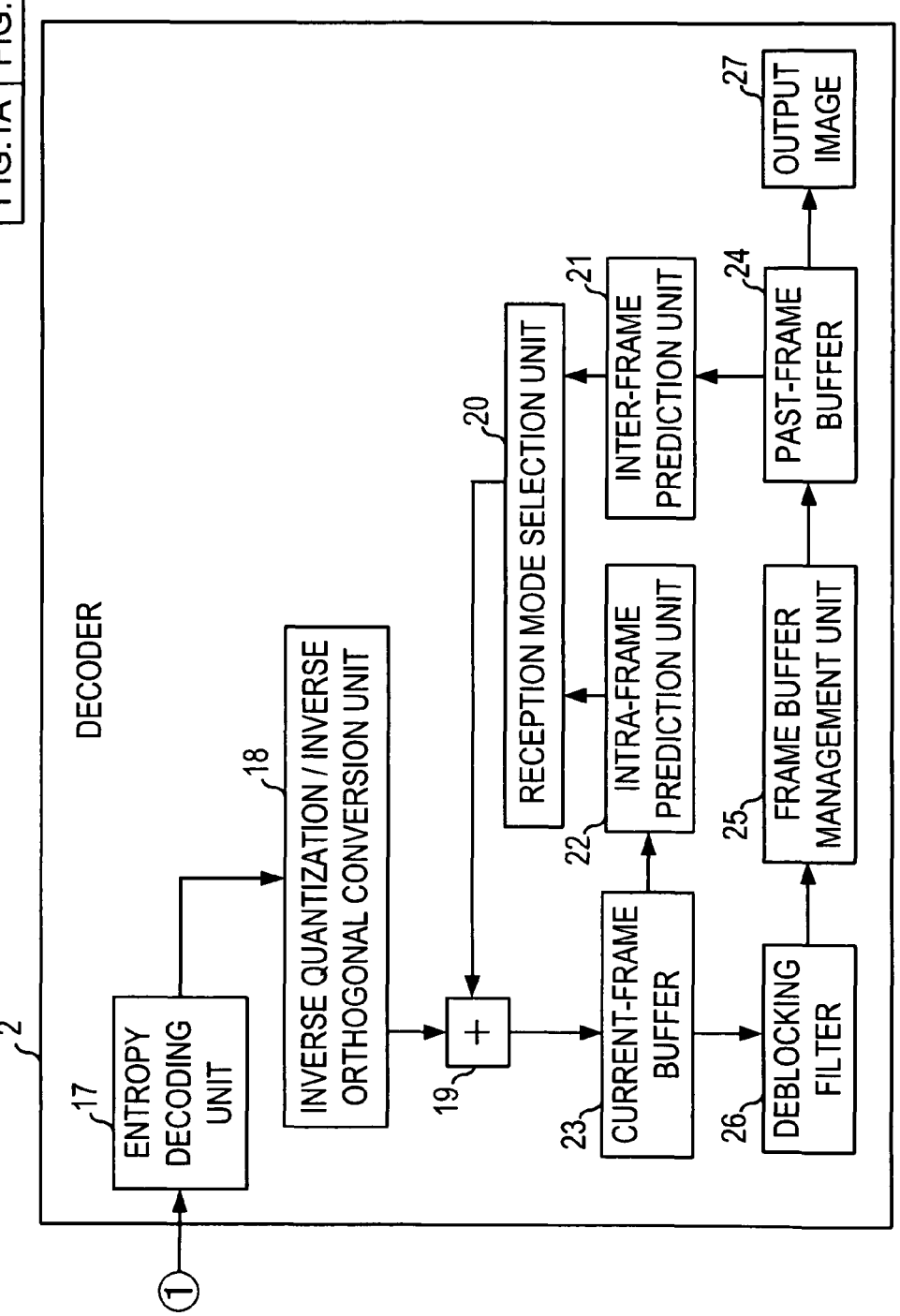
FIG. 1 is a schematic diagram illustrating a configuration of an encoder and a decoder.

FIG. 1 illustrates a schematic diagram of an encoder 1 and a decoder 2 of an image-processing device.

The encoder 1 includes a Macro Block (MB) division unit 4, a subtractor 5, an orthogonal conversion quantization unit 6, an entropy encoding unit 7, an inverse quantization/inverse orthogonal conversion unit 8, an adder 9, a prediction mode selection unit 10, an inter-frame prediction unit 11, an intra-frame prediction unit 12, a current-frame buffer 13, a past-frame buffer 14, a frame buffer management unit 15, and a deblocking filter 16.

The MB division unit 4 divides an input image 3 picked up by an imaging device into units of Macro Blocks (MBs) to output to the subtractor 5 and the inter-frame prediction unit 11. Although it is not shown in FIG. 1, when the input image 3 thus divided is input to the inter-frame prediction unit 11, a motion vector is detected based on motion vector detection.

The subtractor 5 subtracts the output data from the MB division unit 4 and output data from the inter-frame prediction unit 11 or the intra-frame prediction unit 12 and then outputs a result.

The orthogonal conversion quantization unit 6 performs Discrete Cosine Transform (DCT) on a result of the subtraction and then performs quantization.

The entropy encoding unit 7 performs variable-length encoding on data quantized by the orthogonal conversion quantization unit 6 and then outputs the variable-length encoded data.

The inverse quantization/inverse orthogonal conversion unit 8 inverse-quantizes the data quantized by the orthogonal conversion quantization unit 6 and then performs an inverse DCT conversion on the inverse-quantized data to output to the adder 9.

The adder 9 adds the data output from the inverse quantization/inverse orthogonal conversion unit 8 and the data output from the inter-frame prediction unit 11 or from the intra-frame prediction unit 12 chosen by the prediction mode selection unit 10, and outputs the added data.

The prediction mode selection unit 10 chooses the output from the inter-frame prediction unit 11 or from the intra-frame prediction unit 12 and then outputs the data. Details on the inter-frame prediction unit 11 are provided below.

The intra-frame prediction unit 12 performs, in MPEG-4, an intra-frame prediction based on a prediction of a direct current component of a DCT coefficient and a part of an alternating current component.

In addition, in H.264/AVC standard, the intra-frame prediction is performed based on a prediction of a pixel level from adjacent blocks.

The current-frame buffer 13 holds the output data from the adder 9 as a reference picture.

The past-frame buffer 14 manages the output data filtered by the deblocking filter 16 with the frame buffer management unit 15, and holds the output data.

The deblocking filter 16 reduces block distortion caused when an image is encoded.

The decoder 2 includes an entropy decoding unit 17, an inverse quantization/inverse orthogonal conversion unit 18, an adder 19, a prediction mode selection unit 20, an inter-frame prediction unit 21, an intra-frame prediction unit 22, a current-frame buffer 23, a past-frame buffer 24, a frame buffer management unit 25, and a deblocking filter 26.

The entropy decoding unit 17 receives a video stream transferred from the encoder 1 and performs variable-length decoding on encoded data thus received to output to the inverse quantization/inverse orthogonal conversion unit 18.

The inverse quantization/inverse orthogonal conversion unit 18 inverse-quantizes the variable-length decoded data, performs an inverse DCT conversion on the variable-length decoded data, and then outputs the data.

The adder 19 adds the output data from the inverse quantization/inverse orthogonal conversion unit 18 and the output data from the inter-frame prediction unit 21 or from the intra-frame prediction unit 22 chosen by the prediction mode selection unit 20, and outputs the added output data.

The prediction mode selection unit 20 chooses the output from the inter-frame prediction unit 21 or from the intra-frame prediction unit 22, and then outputs the data. Details on the inter-frame prediction unit 21 are provided below.

In the same manner as in the case of the intra-frame prediction unit 12, the intra-frame prediction unit 22 performs, in MPEG-4, the intra-frame prediction based on a prediction of the direct current component in the DCT coefficient and the part of the alternating current component.

In addition, the intra-frame prediction is performed, in H.264/AVC standard, based on the prediction of the pixel level from the adjacent blocks.

The current-frame buffer 23 holds the output data from the adder 9.

The past-frame buffer 24 manages output data (frame) filtered by the deblocking filter 26 with the frame buffer management unit 25 and holds the output data.

The deblocking filter 26 reduces the block distortion caused when the image is encoded.

Next, the inter-frame prediction units 11 and 21 shown in FIG. 1 are disclosed.

The inter-frame prediction units 11 and 21 encode only a difference between the input image and a prediction image, thereby achieving a high compression ratio.

There are several inter-frame prediction methods such as a "forward direction prediction" in which the prediction is made based on temporally preceding frames, a "backward direction prediction" in which a prediction is made based on temporally succeeding frames, and a "bi-directional prediction" in which a prediction is made based on temporally preceding and succeeding frames.

A frame encoded only by using the forward direction prediction is referred to as a "P frame (Predicted Frame)." On the other hand, a frame encoded with the use of one of the above-disclosed three types of prediction, that is to say, the forward direction prediction, the backward direction prediction, or the bi-directional prediction, is referred to as a "B frame (Bi-directional Predicted Frame)."

The frame encoded without using the inter-frame prediction is referred to as an "I frame (Intra-coded Frame)."

In a device having a mechanism in which the above disclosed differential encoding is used, compression is performed in the following manner: The intra-frame prediction removing redundancy in a frame is carried out in units of blocks by using the orthogonal conversion or the quantization in which the input image 3 is processed in units of blocks within the Macro Block in the encoding by the encoder 1. The inter-frame prediction removing redundancy between frames by extracting a predicted difference obtained by motion-compensation of a plurality of past-frames. Entropy encoding is performed on values of the calculation results obtained by the inter-frame prediction and the intra-frame prediction, so that the compression can be achieved.

In addition, the decoder 2 performs the process opposite to the encoding to execute the decoding in the decoding process.

The Temporal Direct mode used in the inter-frame prediction is such a prediction-encoding mode in which vector information is represented as a backward reference picture (Picture) and temporal distances of a target picture, the backward reference pictures, and the forward reference pictures are calculated to generate the vectors.

FIG. 2 illustrates a principle of a Temporal Direct operation. Hereinafter, the Temporal Direct mode will be disclosed.

In the Temporal Direct mode (hereinafter referred to as a "TD"), motion information of an anchor block is searched and a motion vector of a forward reference picture L0 of the anchor block is represented as an mvCol (MV of the Co-located block).

If the anchor block does not have the motion vector of the forward reference picture L0 but has a motion vector of a backward reference picture L1, the motion vector of a backward reference picture L1 is represented as the mvCol.

A picture that the forward reference picture L0 refers to is a picture referred to by the mvCol, and a reference picture that the backward reference picture L1 refers to is an anchor picture.

The anchor block mentioned here is a picture with the smallest reference number (generally, the nearest reference picture to be referred to) in an L1 direction (generally, in a "future" direction).

If the anchor block is intra-frame-encoded and does not have the motion information, the size of the motion vector is represented as "0" and the forward reference picture L0 is the reference picture having the reference picture number 0 among the L0 reference pictures.

Next, a motion vector mvL0 of the L0 and a motion vector mvL1 of the L1 are calculated from the motion vector mvCol.

If the motion speeds among 3 pictures, that is, among a target picture Lcu, the backward reference picture L1, and the forward reference picture L0, are the same, the magnitude of the motion vector mvL0 and the motion vector mvL1 may be calculated by proportional distribution based on time intervals among the calculation target picture Lcu, the backward reference picture L1, and the forward reference picture L0.

$$mvL0 = mvCol \times tb/td \qquad \text{Expression 1}$$

The "tb" represents a temporal distance between the calculation target picture Lcu and the forward reference picture L0.

The "td" represents a temporal distance between the backward reference picture L1 and the forward reference picture L0.

Since the motion vector mvL1 is an inverse of the mvCol, the motion vector mvL1 may be calculated by Expression 2.

$$mvL1 = -mvCol \times (td-tb)/td = mvL0 - mvCol \qquad \text{Expression 2}$$

Next, in the Temporal Direct mode of H.264, the motion vector mvL0 and the motion vector mvL1 is calculated by the following expression.

Note that, since motion vector information of the target picture Lcu is used as mvCol information, the motion vector information is stored in a memory.

This is because the calculation target picture Lcu is used as the backward reference picture L1.

First, the "tb" and the "td" are calculated by Expression 3 and Expression 4 based on a POCCU, a POC0, and a POC1.

$$tb = POCCU - POC0 \qquad \text{Expression 3}$$

$$td = POC1 - POC0 \qquad \text{Expression 4}$$

The POCCU is a Picture Order Count (compression encoded data) of the target picture.

POC0 is a Picture Order Count (compression encoded data) of the forward reference picture L0.

The POC1 is a Picture Order Count (compression encoded data) of the backward reference picture L1.

In addition, a "tx" is calculated by Expression 5.

$$tx = (16384 + Abs(td/2))/td \qquad \text{Expression 5}$$

Then, the DSF that is an output of the DSF calculator 127 is calculated by Expression 6. Expression 7 represents the Clip3.

Here, the reference symbol ">>" in Expression 6 indicates a shift direction and represents a six-bit shift in Expression 6.

$$DSF = Clip3(-1024, 1023, (tb*tx+32) >> 6) \qquad \text{Expression 6}$$

$$Clip3(x,y,z) = x : z < x$$

$$Clip3(x,y,z) = y : z > y$$

$$Clip3(x,y,z) = z : \text{otherwise} \qquad \text{Expression 7}$$

The mvL0 and the mvL1 of the TD in Expression 8 and Expression 9 are calculated by using the above calculation results.

$$mvL0=(DSF \times mvCol+128)>>8 \qquad \text{Expression 8}$$

As a result of the above calculation, the mvL0 and the mvL1 determine the proportion of the time intervals among the target picture Lcu, the backward reference picture L1, and the forward reference picture L0.

Note that the backward reference picture L1 is a RefIdxL1 [0], in the TD operation of H.264.

Hereinafter, a Weighted Prediction used in the inter-frame prediction shown in FIG. 3 is disclosed.

Use of the Weighted Prediction (hereinafter, "WP") makes it possible to attach importance to reference frames.

For example, this is effective for a case in which fading is used in a scene, or for a case in which a following picture is very similar to a preceding picture.

In addition, when fading pictures or the like are used in which brightness changes with time, performance may be greatly improved. This is because the prediction is made by adaptively multiplying a weighted coefficient to the plurality of reference frames by using signals, to which the plurality of reference frames are adaptively weighting-added, for the prediction.

Like the TD, the POCCU, the POC0, and the POC1 are calculated from the calculation target picture Lcu, the forward reference picture L0, and the backward reference picture L1, and the DSF calculation is made.

A forward weighted coefficient (W0) and a backward weighted coefficient (W1) are obtained by Expression 10 and Expression 11 shown below.

$$W0=64-DSF>>2 \qquad \text{Expression 10}$$

$$W1=DSF>>2 \qquad \text{Expression 11}$$

The prediction image may be calculated by Expression 12.

$$\text{Prediction image}=W0 \times Y0+W1 \times Y1 \qquad \text{Expression 12}$$

The Y0 is a forward motion compensation prediction image and the Y1 is a backward motion compensation prediction image.

Note that the plurality of frames may be referable as the forward reference picture and the backward reference picture in the WP operation.

Figure 4:
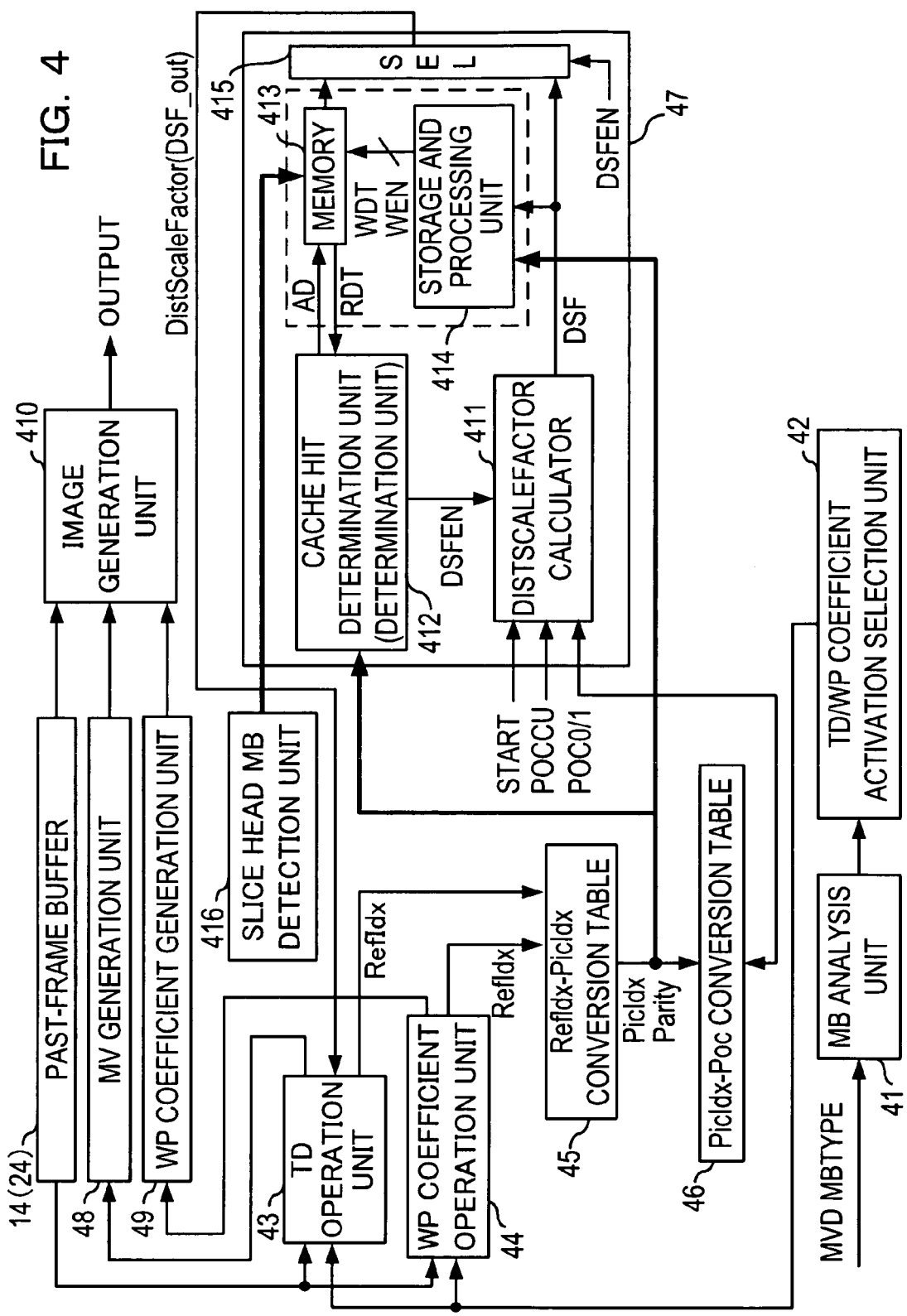
FIG. 4 is a schematic diagram illustrating a configuration of a differential encoding unit.

FIG. 4 is a schematic diagram showing a configuration of the Temporal Direct mode operation unit and the Weighted Prediction operation unit in the inter-frame prediction unit.

The Temporal Direct mode operation unit and the Weighted Prediction operation unit include an MB analysis unit 41, a TD/WP coefficient activation selection unit 42, a TD operation unit 43, a WP coefficient operation unit 44, a RefIdx-PicIdx conversion table 45, a PicIdx-Poc conversion table 46, a DSF calculation unit 47, an MV generation unit 48, a WP coefficient generation unit 49, and an image generation unit 410.

The MB analysis unit 41 analyzes a Macro Block type (MB_type) and analyzes whether to perform a Temporal Direct mode process or a Weighted Prediction process.

Hereinafter, the Temporal Direct mode process is referred to as a "TD process" and the Weighted Prediction process is referred to as a "WP process."

The TD/WP coefficient activation selection unit 42 chooses the TD operation unit 43 in performing the TD process based on a determination result of the MB analysis unit 41 and chooses the WP coefficient operation unit 44 to perform the WP process.

The TD operation unit 43 performs the Temporal Direct mode operation and outputs a START signal activating the DSF calculation unit 47. Next, the TD operation unit 43 acquires an operation result of the DSF calculation unit 47 and outputs a TD operation result to the MV generation unit 48.

The WP coefficient operation unit 44 performs the Weighted Prediction and outputs the START signal activating the DSF calculation unit 47. Next, the WP coefficient operation unit 44 acquires an operation result of the DSF calculation unit 47 and outputs a WP operation result to the WP coefficient generation unit 49.

The RefIdx-PicIdx conversion table 45 generates a picture index (PicIdx) corresponding to a reference picture index (RefIdx) used by the TD operation unit 43 or the WP coefficient operation unit 44.

The PicIdx-Poc conversion table 46 generates the forward reference picture order count (POC0) and the backward reference picture order count (POC1) from the reference picture index and parity (Parity).

The DSF calculation unit 47 includes a DSF calculator 411, a cache hit determination unit 412, a memory 413, a storage and processing unit 414, and a selector 415. The DSF calculation unit 47 performs a Clip 3 process using the POCCU and the outputs POC0 and POC1 of the PicIdx-Poc conversion table 46, and then outputs the DSF calculation result to the selected TD operation unit 43 or the WP coefficient operation unit 44. The MV generation unit 48 performs a switching operation between an output of a motion vector from the TD operation unit 43 and peripheral prediction vectors other than the TD operation and transfers the motion vector to the image generation unit 410.

The WP coefficient generation unit 49 performs a switching operation between an output of a WP coefficient operation from the WP coefficient operation unit 44 (Implicit) and outputs from the WP coefficient operations of the other WP operations to transfer the motion vector to the image generation unit 410.

The image generation unit 410 generates the inter-frame prediction image with use of the output from the MV generation unit 48 or the output of the WP coefficient generation unit 49 relative to an image of the past-frame buffer 14 (24).

The RefIdx-PicIdx conversion table 45 in a TD operation time is disclosed below.

Figure 5:
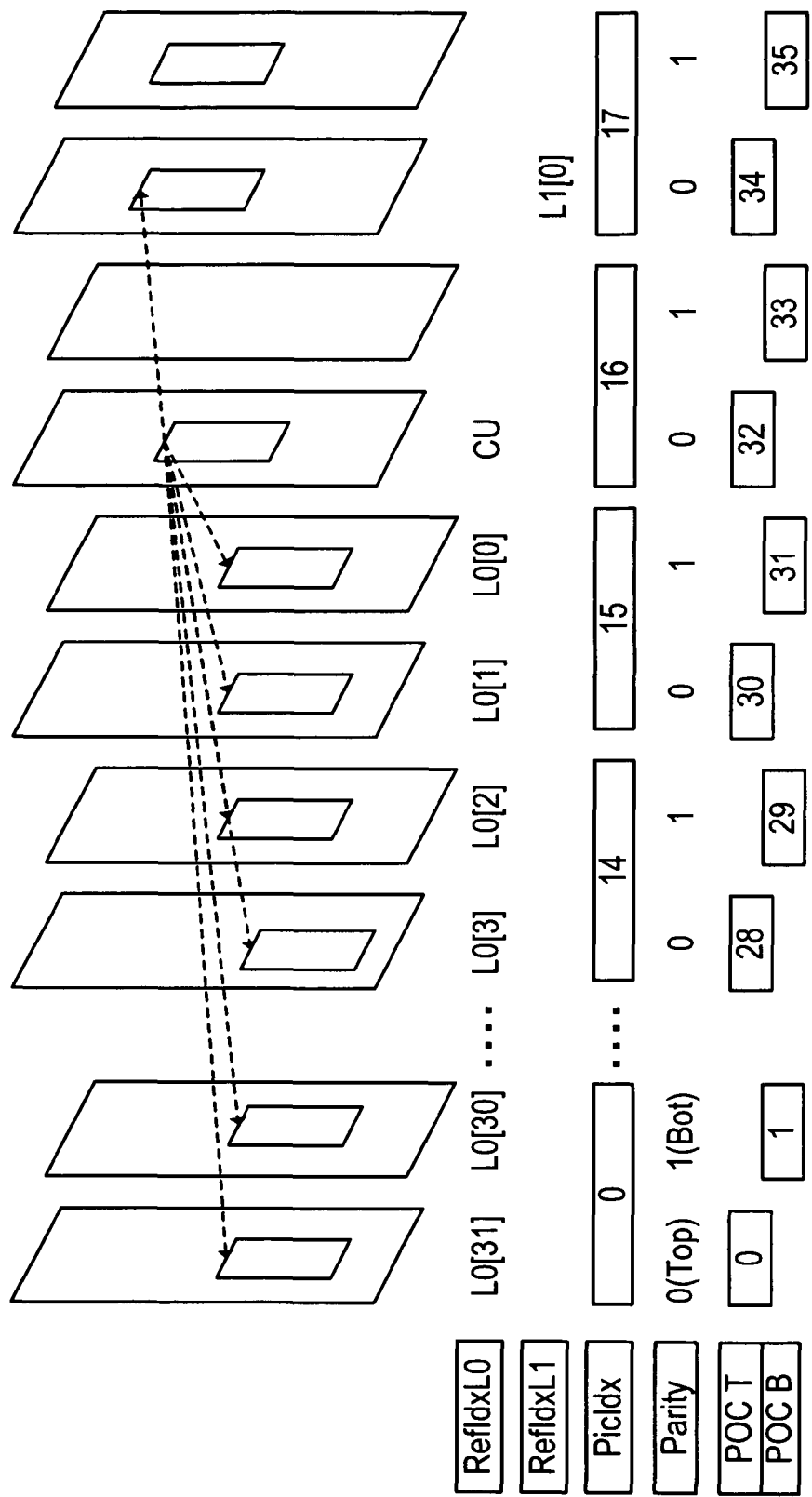
FIG. 5 illustrates a calculation target picture and reference pictures in the Temporal Direct mode operation.

FIG. 5 illustrates a relationship among reference pictures in the TD operation time. An L0[0] to an L0[31] as the forward reference picture index RefIdxL0, an L1[0] as the backward reference picture index RefIdx1, and the calculation target picture (CU shown in FIG. 5) are arranged.

The RefIdx-PicIdx conversion table 45 generates the picture index with respect to each interlace image of the forward reference picture, of the calculation target pictures, and of the backward reference picture.

In FIG. 5, the L0[31] and the L0[30] shown on a row of the forward reference picture index RefIdxL0 are used as the picture index (PicIdx) "0."

In addition, the L0[29] and the L0[28] are used as the picture index "1," and the L0[27] and the L0[26] to the L0[1] and the L0[0] are assigned as the picture indices.

Next, the picture index "16" is assigned to the calculation target picture CU and the interlace image thereof.

In addition, the picture index "17" is assigned to the L1[0] of the backward picture index RefIdxL1 and the interlace image thereof.

Hereinafter, the PicIdx-Poc conversion table 46 is disclosed.

The reference picture order count (POC) is generated from the picture index and parity (PicIdx) is generated from the RefIdx-PicIdx conversion table 45.

If the picture index is "0" and the parity is "0" (Top), "0" is assigned to a POCT in FIG. 5.

In the same way, if the parity is "1" (Bottom), "1" is assigned to a POCB in FIG. 5.

In the same way, the reference picture order counts from "2" to "35" are assigned to the picture indices "1" to "17" based on the parity.

Hereinafter, the RefIdx-PicIdx conversion table 45 in the WP operation time is disclosed.

Figure 6:
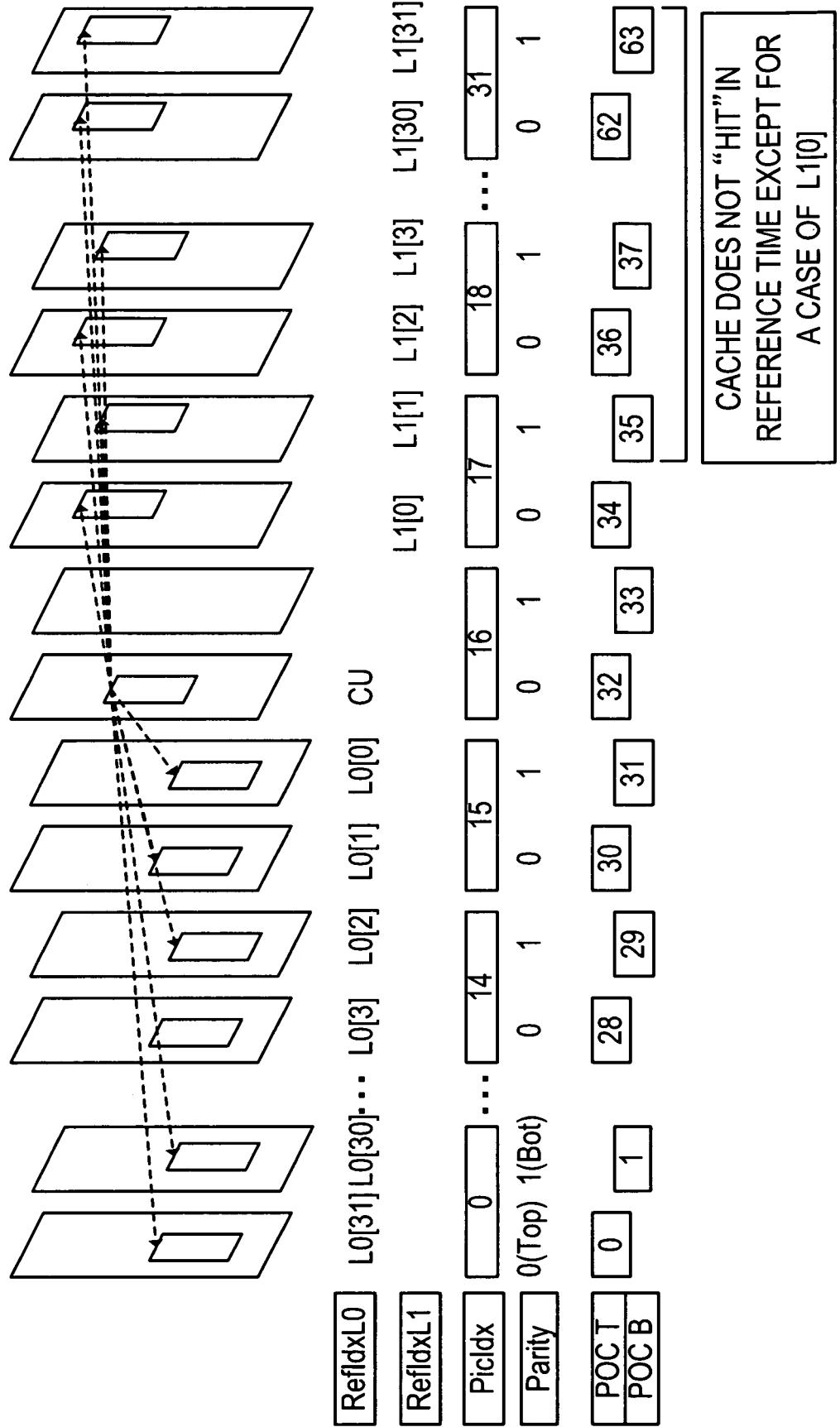
FIG. 6 illustrates a calculation target picture and reference pictures in the Weighted Prediction operation.

FIG. 6 illustrates a relationship among the reference pictures in the WP operation time. An L0[0] to an L0[31] as the forward reference picture index RefIdxL0, an L1[0] to an L1[31] as the backward reference picture index RefIdxL1, and the calculation target picture (a CU shown in FIG. 6) are arranged.

The RefIdx-PicIdx conversion table 45 generates the picture index with respect to the each interlace image of the forward reference picture, of the calculation target picture, and of the backward reference picture.

In FIG. 6, the L0[31] and the L0[30] shown on a row of the forward reference picture index RefIdxL0 are used as the picture index (PicIdx) "0."

In addition, the L0[29] and the L0 [28] are used as the picture index "1" and the L0[27] and the L0[26] to the L0[1] and the L0[0] are assigned as the picture in the same way.

Next, the picture index "16" is assigned to the calculation target picture CU and the interlace image thereof.

Moreover, the picture indices "17" to "31" are assigned to the L1[0] to the L1[31] of the backward reference picture index RefIdxL1 and the interlace images thereof.

Hereinafter, the PicIdx-Poc conversion table 46 is disclosed.

The reference picture order count (POC) is generated from the picture index, and the parity is generated from the RefIdx-PicIdx conversion table 45.

If the picture index is "0" and the parity is "0" (Top), "0" is assigned to the POCT in FIG. 5.

In the same way, if the parity is "1" (Bottom), "1" is assigned to the POCB in FIG. 6.

The reference picture order counts "2" to "63" are assigned to the picture indices "1" to "31" based on the parity in the same way.

Hereinafter, the DSF calculation unit 47 is disclosed.

The DSF calculator (differential coding unit) 411 receives the START signal from the TD operation unit 43 or the WP coefficient operation unit 44 and starts the DSF calculation.

Moreover, the DSF calculator 411 starts the calculation if a DSF enable signal (DSFEN) that is output from the cache hit determination unit (determination unit) and determines whether to perform the DSF calculation, is enabled. On the other hand, the DSF calculator 411 does not start the DSF calculation when the DSF enable signal is disabled even if the START signal is enabled.

The DSF calculator 411 performs the Clip3 process with use of the POCCU and the outputs POC0 and POC1 of the PicIdx-Poc conversion table 46 and outputs the DSF calculation result to the TD operation unit 43 or the WP coefficient operation unit 124, one of which has been chosen.

The cache hit determination unit 412 (determination unit) determines whether the DSF calculation has been performed or not.

The cache hit determination unit 412 chooses the DSF calculation result recorded on the memory 413 with use of a result of the RefIdx-PicIdx conversion table 45 or of the PicIdx-Poc conversion table 46, and the cache hit determination unit 412 disables the DSF calculation enable signal if the calculation has been performed.

If the calculation has not been performed, the cache hit determination unit 412 enables the DSF calculation enable signal.

The memory 413 and the storage and processing unit 414 form a calculation result storage unit (See area within the dotted line in FIG. 4).

The storage and processing unit 414 selects an address of the memory 413 based on the result of the RefIdx-PicIdx conversion table 413 or of the PicIdx-Poc conversion table 46, and the DSF calculation result is recorded on the selected address.

Moreover, a hit flag of the address that stores the DSF calculation is enabled. On the other hand, the hit flag is in a disabled state if the DSF calculation has not been performed.

Note that when the cache hit determination unit 412 determines that the calculation has been performed, the DSF calculation result is output from the memory 413.

FIG. 7 is a schematic diagram of a memory illustrating a structure of the memory 413 used for the TD operation.

The memory 413 in FIG. 7 uses, as the address, the output of the RefIdx-PicIdx conversion table 45.

In FIG. 5, the picture indices from 0 to 15 are used for the forward reference pictures and the parity "0" or parity"1" is attached to each picture index.

In addition, since the backward reference picture is fixed, the addresses corresponding to 0 to 17 are necessary.

Moreover, the picture indices "0" to "31" are prepared in the WP operation.

As disclosed above, the memory 413 stores the results of the DSF calculations that correspond to the addresses determined based on the above-disclosed picture indices and the parity.

Note that when a slice head MB detection unit 416 detects a head Macro Block of a slice, a content recorded on the memory 413 is erased.

The DSF calculation result recorded on the memory 413 is the result calculated based on the POC0 and the POC1, which are the results of the PicIdx-Poc conversion table 46 obtained from the POCCU, the picture index used as the address, and the parity.

The selector 415 chooses, based on the DSF calculation enable signal, whether to use the calculation result from the memory 413 or to use the calculation result of the DSF calculator 411 as a direct calculation result.

The present embodiment is provided with a cache capacity for the pictures used in the TD operation and the cache capacity is reused in the TD operation and in the WP operation.

In the TD operation, the backward reference frame is the fixed RefIdxL1 [0] and the forward reference frames are the RefIdxL0 [0 to 31] and, in consequence, the TD operation requires memory thereof.

It is highly possible that the DSF calculation generated by the TD operation is reused in the TD operations and the WP operations that follow the preceding Macro Block process, and as a result, a high-speed operation may be achieved.

Note that the unit executing the TD operation and the unit executing the WP operation are not necessarily provided together. Each unit may be provided alone.

Figure 8A:
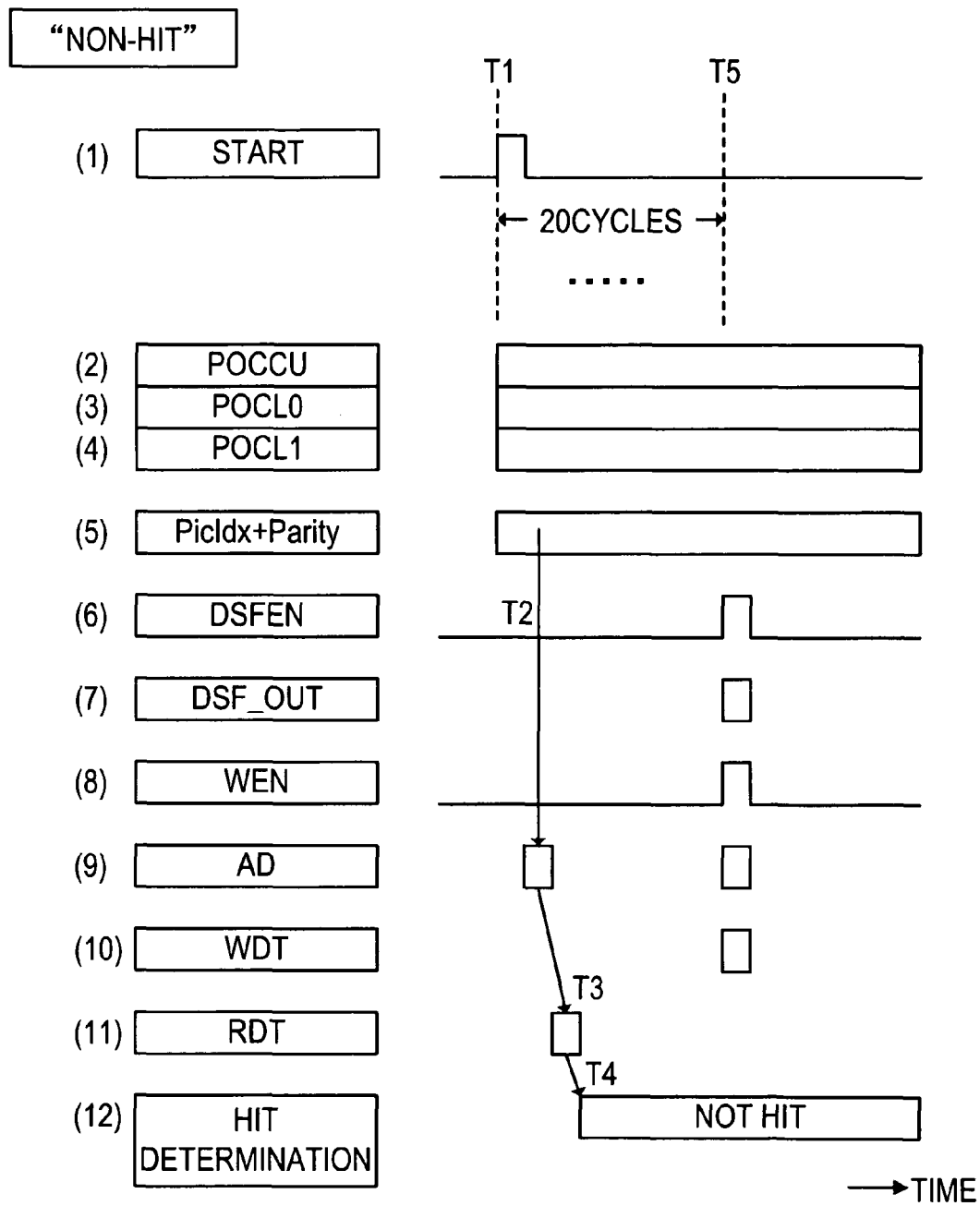
FIGS. 8A and 8B illustrate time charts in a hit determination time where 8A indicates a case of "non-hit" and 8B indicates a case of "hit;"
Figure 8B:
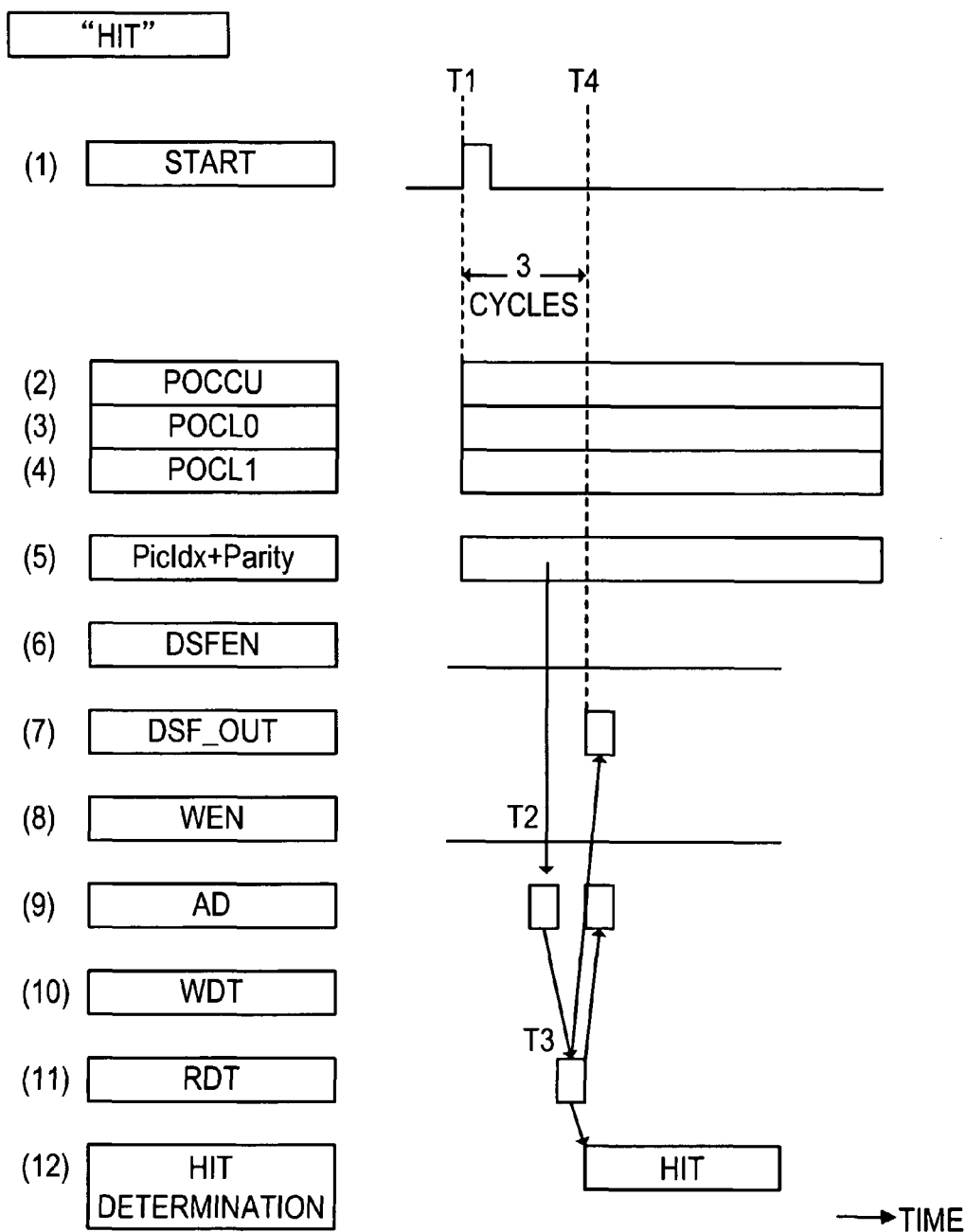

FIGS. 8A and 8B are time charts indicating operations of the DSF calculation unit.

FIG. 8A is the time chart indicating a case where the DSF calculation is not started.

FIG. 8B is the time chart indicating a case where the DSF calculation has been performed.

A longitudinal axis indicates a voltage level and a horizontal axis indicates time in FIGS. 8(A) and 8(B).

In FIGS. 8A and 8B, (1) to (12) have the following meanings, respectively: (1) The START signal, (2) a POCCU signal, (3) a POC0 signal, (4) a POC1 signal, (5) a PicIdx+Parity Signal, (6) a DSFEN signal, (7) a DSF_OUT signal, (8) a WEN signal, (9) an AD signal, (10) a WDT signal, (11) a RDT signal, and (12) a hit determination.

FIG. 8A is a time chart in a case of a "non-hit" (See FIG. 4).

In timing T1, when the (1) START signal is output (a level of the signal is high) from the TD operation unit 43 or the WP coefficient operation unit 44, the RefIdx-PicIdx conversion table 45 generates the picture index and the parity ((5) PicIdx+Parity) based on the reference picture index (RefIdx)

Thereafter the PicIdx-Poc conversion table 46 generates the (3) POC0 signal, and the (4) POC1 signal.

In addition, the (1) START signal, the (2) POCCU signal, the (3) POC0 signal, the (4) POC1 signal are input to the DSF calculator 411 and the DSF calculator 411 enters into a wait state for the DSF calculation.

In timing T2, the (5) PicIdx+Parity signal is input to the cache hit determination unit 412 and the (9) AD signal that indicates the address corresponding to the PicIdx+Parity signal is output from the cache hit determination unit 412 to the memory 413.

In timing 4, if the DSF calculation result is not stored on the memory 413 in the timing T3, the cache hit determination unit 412 inputs the (6) DSFEN signal to DSF calculator 411 to perform the DSF calculation.

The calculation result by the DSF calculator 411 is output.

Next, the storage and processing unit 414 outputs the WEN signal of write enable so as to write the calculation result by the DSF calculator 411 (DSF calculation result) in the address corresponding to the PicIdx+Parity in the memory 413.

Next, the DSF calculation result is written in the address indicated by the (9) AD signal, thereafter the SEL 415 outputs the (7) DSF_OUT signal.

FIG. 8B is a time chart indicating a case of a "hit."

In the timing T1, when the (1) START signal (a level of the signal is high) is output from the TD operation unit 43 or the WP coefficient operation unit 44, the RefIdx-PicIdx conversion table 45 generates the picture index and the parity ((5) PicIdx+Parity) based on the reference picture index (RefIdx).

Thereafter the PicIdx-Poc conversion table 46 generates the (3) POC0 signal and the (4) POC1 signal.

In addition, the (1) START signal, the (2) POCCU signal, the (3) POC0 signal, and the (4) POC1 signal are input to the DSF calculator 411 and the DSF calculator 411 enters into the waiting state.

In the timing T2, the (5) PicIdx+Parity signal is input to the cache hit determination unit 412 and the cache hit determination unit 412 outputs the (9) AD signal indicating the address corresponding to the PicIdx+Parity signal to the memory 413.

If the DSF calculation result has been stored on the memory 413 in the timing T3, the DSF calculation result written in the address corresponding to the PicIdx+Parity in the memory 413 is output to the SEL 415 in the timing T4. Then, the SEL 415 outputs the (7) DSF_OUT signal.

As disclosed above, when the cache is unable to be used, approximately 20 cycles are necessary for 1 MV calculation. On the other hand, when the cache is used, only 3 cycles are necessary for 1 MV calculation.

Figures 9, 9A, 9B:
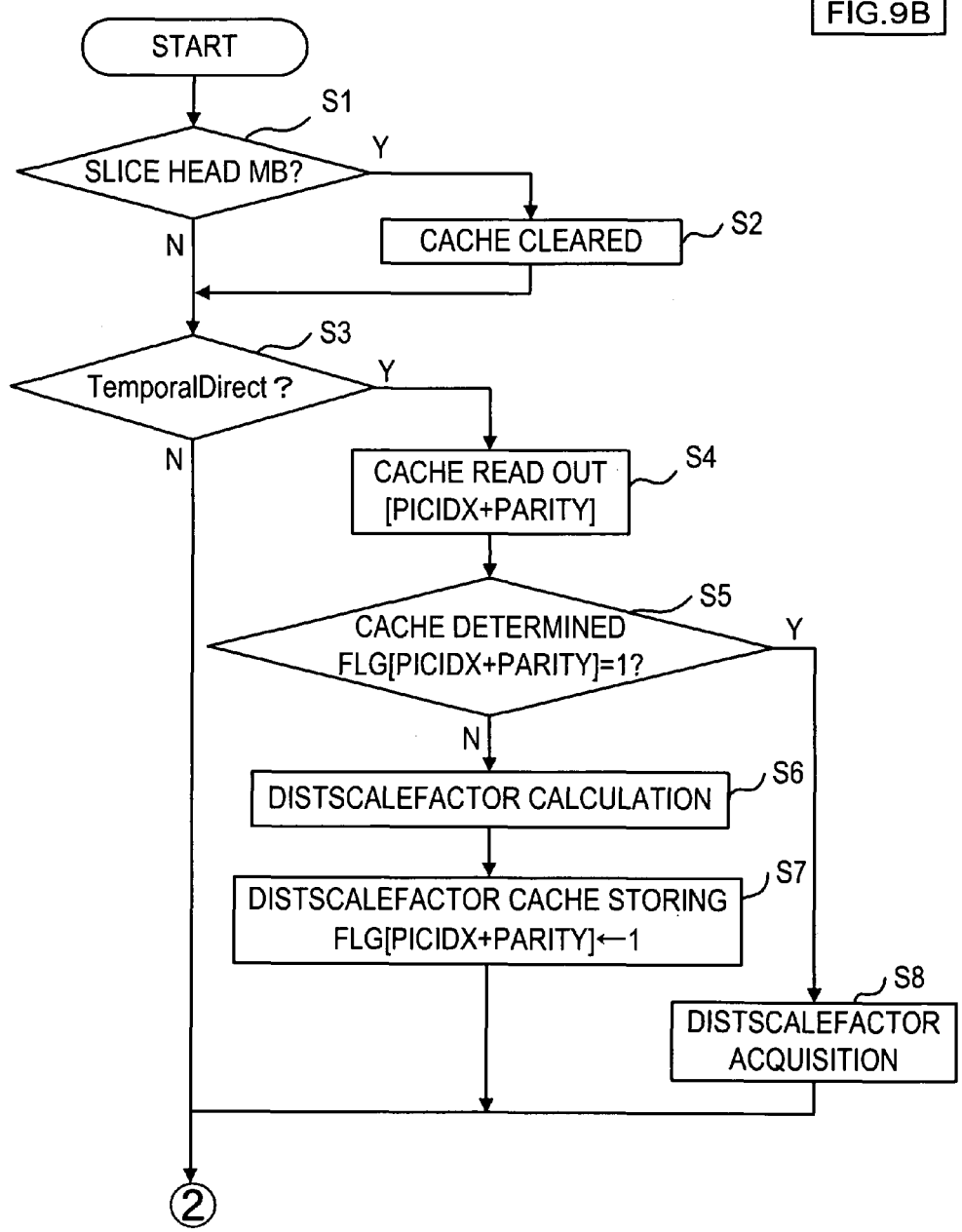
FIG. 9 is a flowchart illustrating control operations when a DSF calculation result is stored to and/or read from a cache.

FIG. 9 is an operational flowchart when the TD operation and the WP operation are performed.

The calculation target picture is stored in the past-frame buffer (I/P-Slice).

Operation S1 determines whether or not the head Macro Block is positioned at head of the B slice (Slice).

If the head Macro Block is detected, the process goes to operation S2.

If the head Macro Block is not detected, the process goes to operation S3.

Figure 10:
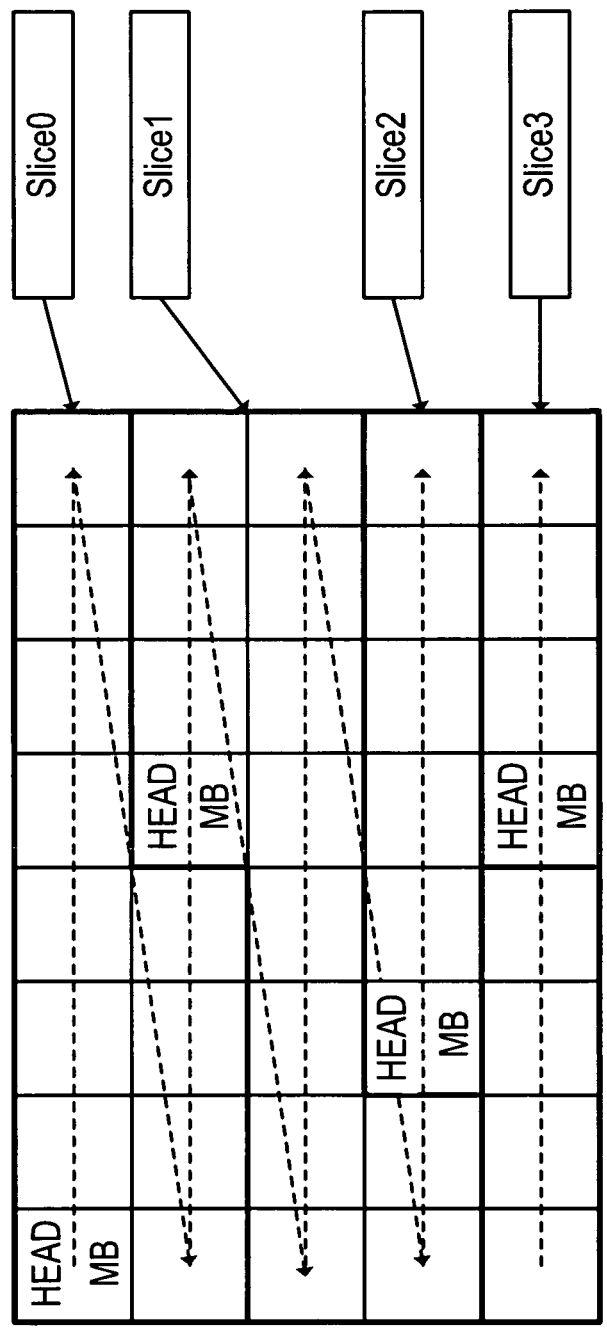
FIG. 10 illustrates detection of a head Macro Block.

For example, if the slices (Slice 0 to Slice 3) as shown in FIG. 10 are present, the head Macro Block in each slice is searched in a direction indicated by a dotted arrow line.

As disclosed above, when one slice is divided into slices such as Slice 0 to Slice 3, even if an error occurred in a certain target Macro Block, this error occurs only within one slice and the error may be prevented from affecting the following slices.

Figure 11A:
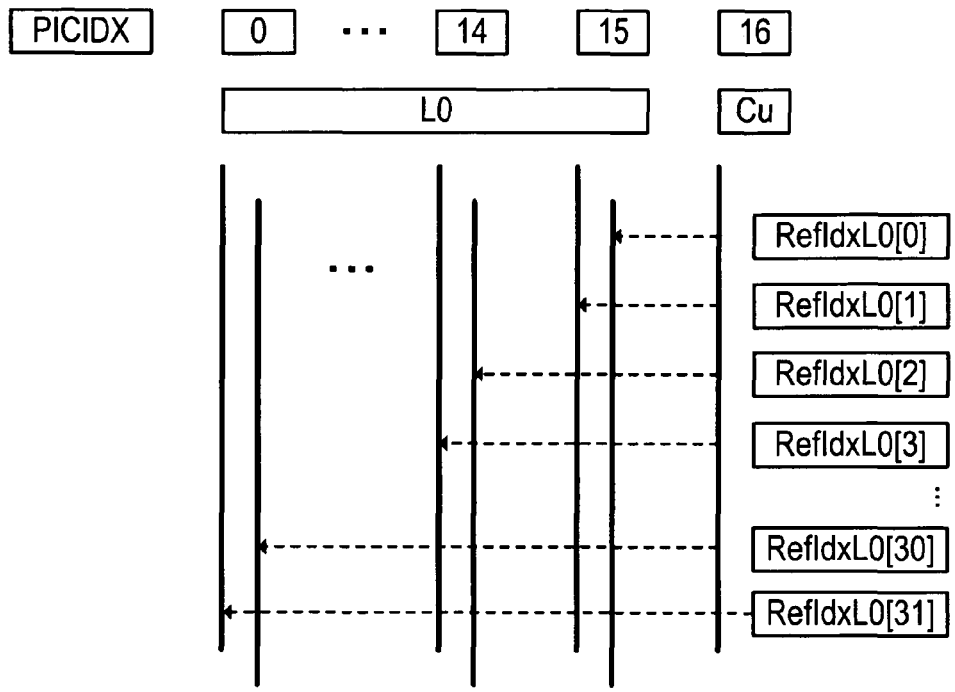
FIG. 11A illustrates a relationship between reference picture indices and picture indices.

In addition, as shown in FIG. 11A, if the picture indices PicIdx0 to PefIdx15 correspond to the reference picture indices RefIdxL0[0] to RefIdxL0[31] in the slice in order, selection may be performed in order even if the head Macro Block is not detected.

Figure 11B:
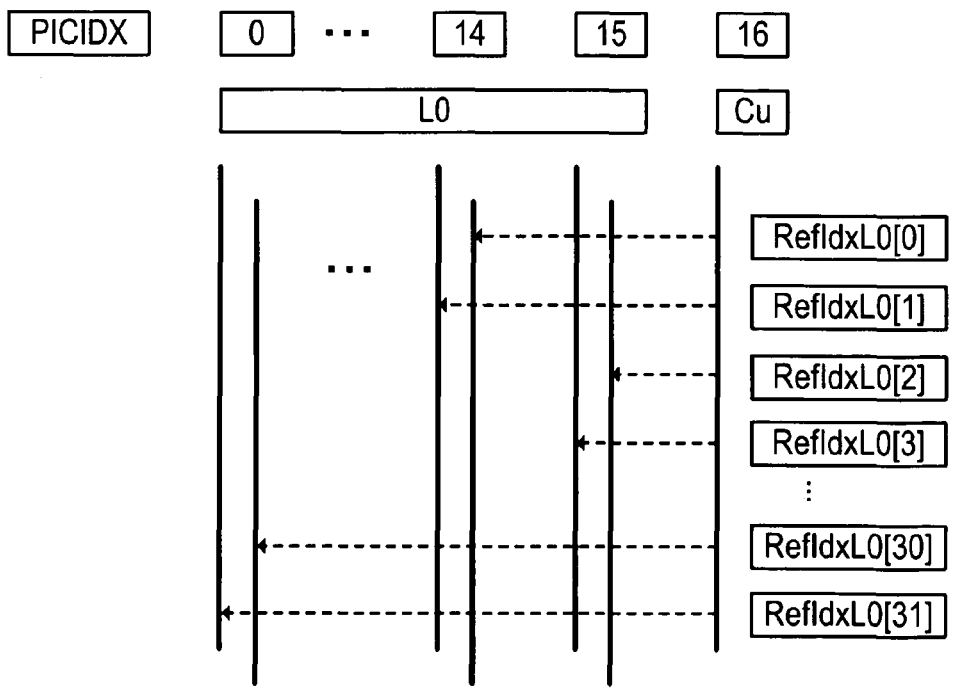
FIG. 11B illustrates a relationship between reference picture indices and picture indices.
Figure 12:
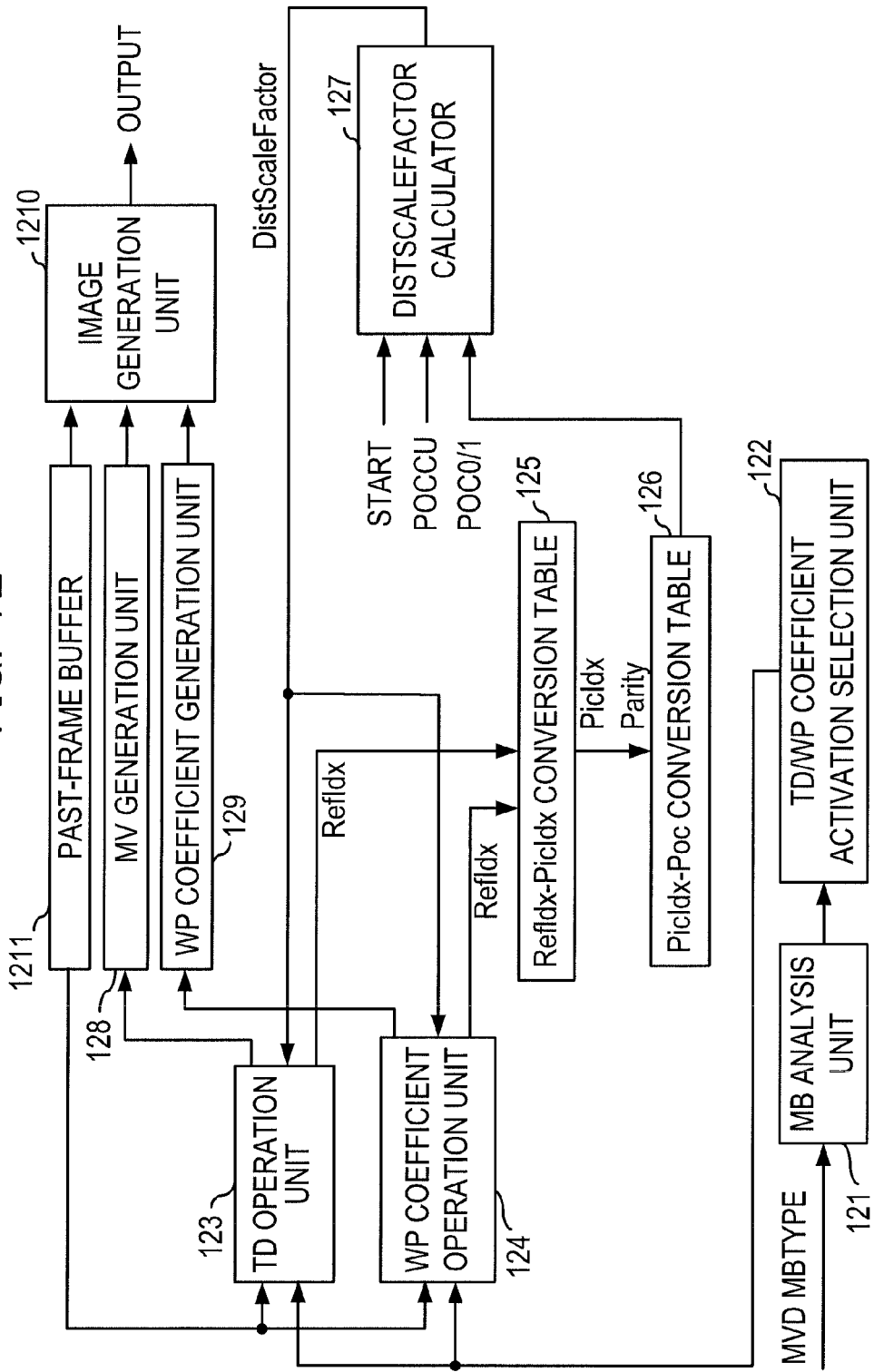
FIG. 12 illustrates a configuration of differential encoding unit.

However, as shown in FIG. 11B, if a relationship between the picture indices and the reference picture indices differs with respect to each slice, that is to say, if there is no regularity, it is necessary to find the head Macro Block with respect to the each slice.

In operation S2, the cache is cleared, that is to say, the content stored in the memory 413 is cleared.

In operation S3, whether to perform the TD operation or not is determined by referring to a macro type (MB_Type).

If the TD operation is performed, the process goes to operation S4. If the TD operation is not performed, the process goes to operation S9.

In operation S4, a content of the address based on the picture index (Picidx) and the parity (Parity) is read out from the cache.

Operation S5 determines whether or not the hit flag of the read-out data (Hit Flg in FIG. 7) is enabled.

The process goes to operation S8 in a case where the hit flag is enabled ("high" in the present embodiment) and the calculation has been performed. If the hit flag is disabled (=0), the process goes to operation S6.

In operation S6, the DSF calculation is executed and a calculation result is stored on the cache and, in operation S7, the hit flag is enabled.

In other words, the POCCU of the calculation target picture, the POC0 of the forward reference picture, and the POC1 of the backward reference picture are acquired and td/tb is calculated based on the above 3 POCs. Then, the tx and the DSF are calculated based on the td/tb.

The DSF calculation result is stored in the memory of the corresponding Picidx+Parity and "1" is stored in the hit flag.

The DSF is transferred to the TD operation unit 43 and mvL0/mvL1 is calculated.

In operation S8, the completed DSF calculation result is acquired from the address based on the picture index and the parity.

That is to say, the DSF calculation result simultaneously read out when the hit flag is referred to by the cache is transferred to the TD operation unit 43 and the mvL0/mvL1 is calculated.

In operation S9, whether or not the WP operation is performed is determined by referring to the macro type (MB_Type). If the WP operation is performed, the process goes to operation S10.

If the WP operation is not performed, the process exits the flowchart. If a WP mode of the target Macro Block is not Implicit, the cache is not accessed (storing and reading-out).

If the WP mode of the target Macro Block is Implicit, whether or not "RefIdxL1" equals zero is determined first.

In operation S10, since the result stored in the cache is unable to be used in a case of "RefIdxL1" is not equal to zero, the process goes to operation S13 so as to perform the DSF calculation based on the POCCU, the POC0, and the POC1.

In the above case of "RefIdxL1=0," the process goes to operation S11 to read out the hit flag of the cache.

In operation S11, the content of the address based on the picture index and the parity is read out from the cache.

Operation S12 determines whether the hit flag of the data thus readout is enabled or not.

In the case where the calculation has been performed, if the hit flag is enabled (1 in the present embodiment), the process goes to operation S14. If the hit flag is disabled (=0), the process goes to operation S13.

In operation S13, the DSF calculation is performed.

That is to say, the POCCU of the calculation target picture, the POC0 of the forward reference picture, and the POC1 of the backward reference picture are acquired and the td/tb is calculated based on the above 3 POCs.

Next, the tx and the DSF are calculated based on the td/tb.

The DSF calculation result is transferred to the WP coefficient operation unit 44 and W0/W1 is calculated.

In operation S14, the DSF calculation result that has been calculated is acquired from the address based on the picture index and the parity.

The DSF calculation result simultaneously read out when the hit flag is referred to by the cache is transferred to the WP coefficient operation unit 44, and the W0/W1 is calculated.

For example, a case of a Full HD size is disclosed below.

$$1920 \text{ pixels } (120 \text{ MB}) \times 1080 \text{ pixels } (68 \text{ MB}) \quad \text{Expression 13}$$

$$120 \text{ MB} \times 68 \text{ MB} = 8160 \text{ MB} \quad \text{Expression 14}$$

Although a first Macro Block needs to be processed, when the TD operation and the WP operation are necessary for the remaining Macro Blocks and when the DSF calculation may be reused, a calculation represented by Expression 15 is performed.

$$(8160-1) \times (20-3) \text{ cycles} = 138703 \text{ cycles} \quad \text{Expression 15}$$

Note that the present embodiment is advantageous for such cases where the Macro Block is further divided into pieces.

According to the embodiment, the control operation shown in the above embodiment may be achieved by using a computer that executes a program including instructions for executing the above control operation.

It is also possible to achieve the above control operation by storing the program on storage media such as a CD-ROM and installing the program on the computer.

Yet, it is also possible to download the program to the computer by using a communication network.

The present invention is not limited to the above-disclosed embodiments and the present invention may be achieved by various modifications to the above embodiments without departing from the concept of the present invention.

In at least one embodiment, it is possible to reduce a process time necessary for an inter-frame prediction by preparing a cache capable of storing a result equal to a picture to be referred for performing a calculation of differential encoding and by reusing a result of the calculation.

What is claimed is:

1. An encoding device which performs image compression with differential encoding, the encoding device comprising:
   a computer configured to provided:
      a calculation result storage unit being adapted to store information based on results of a differential calculation of the differential encoding along with information on reference pictures used for the differential calculation;
      a determination unit which determines, from the information based on results and the information on reference pictures stored in the calculation result storage unit, whether or not the differential calculation has been performed on a reference picture for the differential calculation of a target picture undergoing the image compression, wherein a determination by the determination unit that the differential calculation has been performed thereby indicates that information based on a result of the differential calculation of the target picture is stored in the calculation result storage unit; and
      a differential encoding unit which
         when it is determined by the determination unit that the differential calculation has been performed, reads, from the calculation result storage unit, the information based on the result of the differential calculation of the target picture stored in the calculation result storage unit instead of recalculating the differential calculation of the target picture, and outputs a result in accordance with the information read from the calculation result storage unit, and
         when it is determined by the determination unit that the differential calculation has not been performed, performs the differential calculation of the target picture, and outputs a result based on the performed differential calculation.

2. The encoding device according to claim 1, wherein, for a respective target picture, the information based on results of the differential calculation is calculated by weighting information on a position of an encoding target to a result of a differential calculation between a forward reference picture and a backward reference picture of the target picture.

3. The encoding device according to claim 2, wherein the backward reference picture is fixed.

4. The encoding device according to claim 1, wherein the information on reference pictures which is used for the differential calculation, is appended to information sequences of differentially encoded data.

5. The encoding device according to claim 1, wherein the differential encoding unit performs a distance scale factor calculation used for a Time Direct operation.

6. The encoding device according to claim 1, wherein the differential encoding unit performs a distance scale factor calculation used for a Weighted Prediction operation.

7. A decoding device which decodes an image on which image compression has been performed with differential encoding, the decoding device comprising:
   a computer configured to provided:
      a calculation result storage unit which stores information based on results of a differential calculation used for decoding the differential encoding along with information on reference pictures used for the differential calculation;
      a determination unit which determines, from the information based on results and the information on reference pictures stored in the calculation result storage unit, whether or not the differential calculation has been performed on a reference picture for the differential calculation of a target picture undergoing decoding, wherein a determination by the determination unit that the differential calculation has been performed thereby indicates that information based on a result of the differential calculation of the target picture is stored in the calculation result storage unit; and a differential decoding unit which when it is determined by the determination unit that the differential calculation has been performed, reads, from the calculation result storage unit, the information based on the result of the differential calculation of the target picture stored in the calculation result storage unit instead of recalculating the differential calculation of the target picture, and outputs a result in accordance with the information read from the calculation result storage unit, and when it is determined by the determination unit that the differential calculation has not been performed, performs the differential calculation of the target picture, and outputs a result based on the performed differential calculation.

8. The decoding device according to claim 7, wherein, for a respective target picture, the information based on results is calculated by weighting information on a position of a decoding target to a result of a differential calculation between a forward reference picture and a backward reference picture of the target picture.

9. The decoding device according to claim 8, wherein the backward reference picture is fixed.

10. The decoding device according to claim 7, wherein the information on the reference pictures which is used for the differential calculation, is appended to information sequences of differentially encoded data.

11. The decoding device according to claim 7, wherein the differential decoding unit performs a distance scale factor calculation used for a Time Direct operation.

12. An encoding method which performs image compression with differential encoding, the encoding method comprising:

storing, in a storage, information based on results of a differential calculation of the differential encoding along with information on reference pictures used for the differential calculation;

determining, by a computer, from the stored information based on the results and the stored information on reference pictures, whether or not the differential calculation has been performed on a reference picture for the differential calculation of a target picture undergoing the image compression, wherein a determination by said determining that the differential calculation has been performed thereby indicates that information based on a result of the differential calculation of the target picture is stored in the storage;

when it is determined by said determining that the differential calculation has been performed, reading, by a computer, from the storage, the information based on the result of the differential calculation of the target picture stored in the storage instead of recalculating the differential calculation of the target picture, and outputting a result in accordance with the information read from the storage; and when it is determined by said determining that the differential calculation has not been performed, performing, by a computer, the differential calculation of the target picture, and outputting a result based on the performed differential calculation.

13. A decoding method which decodes an image on which image compression with differential encoding has been performed, the method comprising:

storing, in a storage, information based on results of a differential calculation of the differential encoding along with information on reference pictures used for the differential calculation;

determining, by a computer, from the information based on results and the information on reference pictures stored in the storage, whether or not the differential calculation has been performed on a reference picture for the differential calculation of a target picture undergoing decoding, wherein a determination by said determining that the differential calculation has been performed thereby indicates that information based on a result of the differential calculation of the target picture is stored in the storage;

when it determined by said determining that the differential calculation has been performed, reading, by a computer, from the storage, the information based on the result of the differential calculation of the target picture stored in the storage instead of recalculating the differential calculation of the target picture, and outputting a result in accordance with the information read from the storage; and when it is determined by said determining that the differential calculation has not been performed, performing, by a computer, the differential calculation of the target picture, and outputting a result based on the performed differential calculation.

* * * * *